United States Patent Office 3,361,486
Patented Jan. 2, 1968

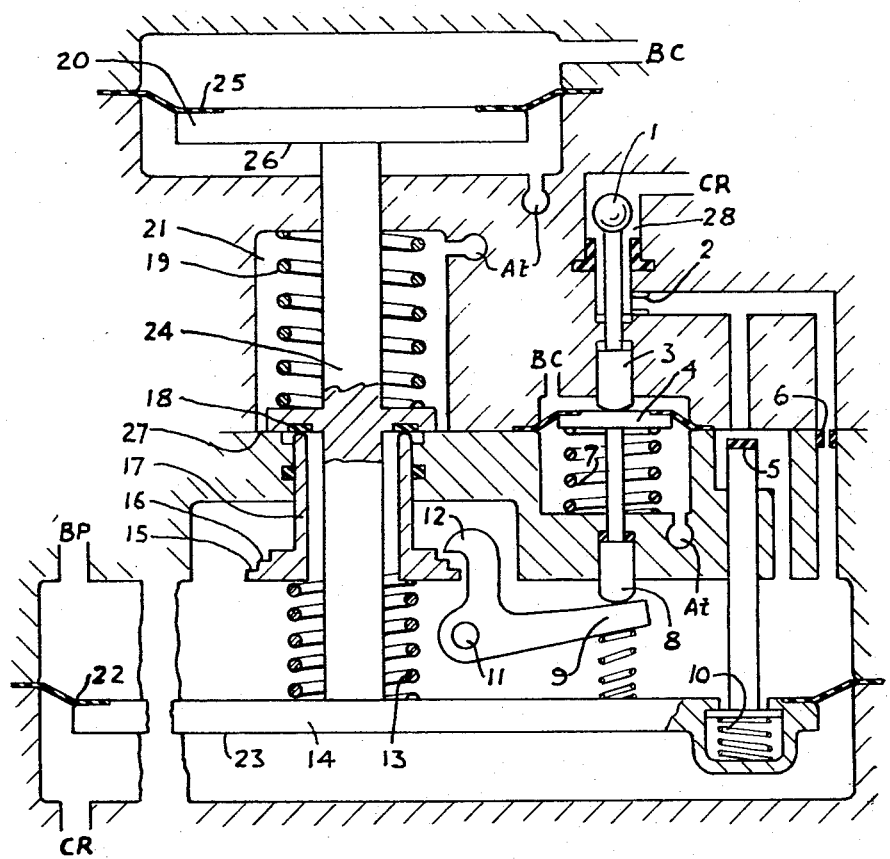

3,361,486
DISTRIBUTORS FOR BRAKING APPARATUS
Arthur W. Simmons, Jack Washbourn, and David J. Wickham, London, England, assignors to Westinghouse Brake and Signal Company, Limited, London, England
Filed Nov. 2, 1965, Ser. No. 506,069
10 Claims. (Cl. 303—36)

This invention relates to distributors for braking apparatus.

Each distributor generally comprises a main pile having two diaphragms coupled to each other and acting in opposition to control the connection of an auxiliary reservoir to a brake cylinder and the latter to atmosphere, one diaphragm being subject to the difference between brake pipe pressure and control reservoir pressure, and the other diaphragm being subject to brake cylinder pressure and atmosphere.

A distributor also usually comprises a control reservoir charging valve which is arranged to be closed upon a brake application taking place, and re-opened at some late stage of release. This valve controls a choked passage between control reservoir and brake pipe, and can contain a restrictor valve open in release position but closed by movement of the main pile away from release position to considerably restrict this passage.

An important feature of a graduated release distributor is its sensitivity and by this is meant the amount the brake pipe pressure must be reduced in order to commence a brake application. This becomes particularly important when using a small control reservoir capacity since only a minimum amount of movement of the distributor pile to open the quick service valve is then permissible. However, limited movements of this nature call for exceedingly close, and thus expensive, manufacturing limits.

This becomes especially evident under practical operating conditions where it is sometimes necessary to obtain what may be termed a "re-quick" service action irrespective of whether the distributor pile has moved to a partial release position or to a substantially full release position.

Accordingly, the present invention provides a distributor for fluid pressure operable braking apparatus having a quick service valve comprising a valve member and a biassed seat member, the valve member being arranged for movement by a main dsitributor pile and the seat member being arranged to be constrained by latch means engageable therewith, the arrangement being such as to permit the latch means to disengage and allow the seat member to follow up and close the quick service valve upon a certain degree of brake application obtaining, the seat member or latch means being provided with means allowing engagement in at least two positions of the main distributor pile.

One such position may correspond to a partial release position and another such position may correspond to the full release position, or substantially so.

The seat member may be conveniently provided with two shoulders or stops, one for engagement by the latch means in a partial release position and the other for engagement in a substantially normal full release position of the main pile.

Alternatively, the latch means may comprise a stem having two shoulders or steps engageable by a step or shoulder on the seat member in the above two positions, respectively.

More specifically, according to the invention, there is provided a distributor having a quick service valve and a restrictor valve with two steps on the seat member of the quick service valve, one step being arranged in the optimum position to give minimum pile movement from release position to quick service position, and the other step being arranged in a position to ensure that re-engagement of the latch in the pile moving to release position takes place before the restrictor valve opens.

The latch means may be controlled in any suitable manner such as by a diaphragm assembly subject to brake cylinder pressure and atmosphere.

The invention will now be described, by way of example, with reference to the accompanying drawing which illustrates, in cross-section, a quick service valve for a graduated release distributor having latch means for controlling the seat member of the quick service valve in two positions.

The distributor has a main pile comprising a main diaphragm 14 mounted such as to be subject on its upper side 22 to brake pipe pressure BP and on its lower side 23 to control reservoir pressure CR. The main diaphragm 14 is coupled by a stem 24 to a further diaphragm 20 subject on its upper side 25 to brake cylinder pressure BC and on its lower side 26 to atmosphere. The pile is arranged to control an inlet and exhaust valve arrangement which, however, does not form part of the present invention and has been omitted for the sake of simplicity of illustration.

The stem 24 carries a quick service valve member 18 engageable with a seat sleeve member 17 which is biassed by spring means 13 and reciprocably and sealingly mounted in a bore concentric with the stem 24. The seat member 17 is provided with two steps or shoulders 15, 16 engageable by one end or nose 12 of bell crank latch means pivotally mounted at 11 and controlled by a diaphragm 4 subject to brake cylinder pressure and atmosphere, in a manner to be described in greater detail hereinafter. As illustrated in the drawing, however, the first step 16, when engaged by the end or nose 12 of the latch 9 corresponds to the position of substantially full brake release, and the second step 15, to the position of partial release.

In the brake release position, spring 19 holds the distributor pile to the position illustrated where the quick service valve member 18 comes against stop 27 in bulb 21 and the seat sleeve member 17 is held against the valve member 18 by its biassing spring 13, thus isolating the brake pipe chamber adjacent side 22 of diaphragm 14 from the bulb 21. The nose 12 of the latch means 9 rests against the side of the upper step 16 on the seat sleeve member 17 but is moved out of engagement by stem 8 being acted upon by diaphragm 4 which disphragm is subject to brake cylinder pressure on its upper side and to atmosphere and the force of a spring 7 in a chamber on its underside. The diaphragm 4 also controls a stem 3 which determines the position of a control reservoir charging bell valve 1 in passage 28 forming a connection between the control reservoir and the brake pipe, which connection is also controlled by a restrictor valve 5 loaded by a spring 10 housed in the main diaphragm 14.

In the brake release position, as illustrated, this restrictor valve 5 is open and the fluid flow between brake pipe and control reservoir is principally via a choke 2, which is the sensitivity choke, but when the restrictor valve is closed the fluid flow can only take place via a choke 6 which is of a predetermined small capacity relatively to that of the choke 2.

It is necessary to have choke 2 effective when the pile is in the release position and not the relatively very small choke 6, because with the brake in release position there must be a reasonable degree of stability of the valve. Small fluctuations in brake pipe pressure must not cause the brake to inadvertently apply, and for practical reasons the larger choke 2 must be used to ensure against this happening.

During the release of a distributor it is important to ensure that when the control charging valve opens and the connection 28 between the brake pipe BP and the control reservoir CR is re-established through the sensitivity choke 2, if a re-application is made, excessive loss of control reservoir pressure will not take place. This can be assured if the restrictor valve is closed, but if the pile is sufficiently near release position so that it is open, then it is necessary for brake cylinder pressure, which controls the control charging valve, to be built up as rapidly as possible, and this is done if a re-quick service is obtained.

With a latch arrangement and with a single step on the sleeve 17, it is desirable to obtain quick service as soon as possible after the pile moves from release position, thus it is necessary for the pile to move to full release position before the latch can re-engage.

If the release has been made by restoring brake pipe pressure slowly, then the pile will not be in release position when the brake cylinder pressure has fallen to the control charging valve re-opening pressure of, say, typically 3 p.s.i. Therefore, if no other provision were provided and a re-application were made there would be a considerable loss of control reservoir pressure before the brake cylinder pressure had built up to the closure pressure of the control charging valve.

With a single step on the sleeve the initial clearance between the latch and the step would have to be equal to the maximum movement of the restrictor valve 5 to the point where it closes. Due to manufacturing limits on all the parts involved, such as the sleeve member 17, latch 9, 12, valve member 18 and so on, this can be considerable and thus give an unwanted large stroke from release position to quick service position. By providing two steps on the sleeve, however, this disadvantage is overcome, the lower step 15 corresponding to the above described single step and being arranged so that in the worst case of manufacturing limits referred to above, the latch can just engage this step before the restrictor valve opens.

This now means that the clearance on the top step 16, which is the movement of the distributor pile to an initial quick service position, can be made with a minimum valve independent of the opening of the restrictor valve and depending purely on the limits of this clearance and allowing, say, typically, 0.005 ins. minimum clearance to permit engagement.

Accordingly, there is thus provided a distributor with a quick service valve and a restrictor valve as described above, having two steps on the quick service valve sleeve 17, one step being arranged in the best position to give minimum pile movement from release position to quick service position, and the other being arranged to ensure re-engagement of the latch in the pile moving to release position before the restrictor valve opens.

Having thus described our invention what we claim is:

1. A distributor for fluid pressure operable braking apparatus having a quick service valve comprising a valve member and a biassed seat member, the valve member being arranged for movement by a main distributor pile and the seat member being arranged to be constrained by latch means engageable therewith, the arrangement being such as to permit the latch means to disengage and allow the seat member to follow up and close the quick service valve upon a certain degree of brake application obtaining, the seat member and latch means being provided with means allowing engagement in at least two positions of the main distributor pile.

2. A distributor as claimed in claim 1, in which one such position corresponds to a partial brake release position and another such position corresponds to the full brake release position.

3. A distributor as claimed in claim 1, in which the seat member is provided with two shoulders or stops, one for engagement by the latch means in a partial release position and the other for engagement in a substantially normal full release position of the main pile.

4. A distributor as claimed in claim 1, in which the latch means comprise a stem having two shoulders or steps engageable by a stop or shoulder on the seat member in a partial and substantially full brake release position, respectively.

5. A distributor as claimed in claim 1 having a restrictor valve with two steps on the seat member of the quick service valve, one step being arranged in the optimum position to give minimum pile movement from release position to quick service position, and the other step being arranged in a position to ensure that re-engagement of the latch in the pile moving to release position takes place before the restrictor valve opens.

6. A distributor as claimed in claim 5, in which the quick service valve seat is in the form of a sleeve.

7. A distributor as claimed in claim 5, in which the restrictor valve is loaded by spring means housed in the main diaphragm of the distributor pile, the restrictor valve being adapted to control, at least in part, a connection between control reservoir and brake pipe.

8. A distributor as claimed in claim 7, in which said connection includes a sensitivity choke.

9. A distributor as claimed in claim 1, in which the latch means are controllable by a diaphragm assembly subject to brake cylinder pressure and atmosphere.

10. A distributor as claimed in claim 9, in which the diaphragm assembly is adapted to control a control reservoir charging valve in a connection between control reservoir and brake pipe.

References Cited
UNITED STATES PATENTS 2,858,170    10/1958    McClure et al. _____ 303—36
2,926,965    3/1960    Wilson et al. _____ 303—36

MILTON BUCHLER, *Primary Examiner.*

T. M. BLIX, *Assistant Examiner.*

Disclaimer 3,361,486.—*Arthur W. Simmons, Jack Washbourn,* and *David J. Wickham,* London, England. DISTRIBUTORS FOR BRAKING APPARATUS. Patent dated Jan. 2, 1968. Disclaimer filed Apr. 22, 1968, by the assignee, *Westinghouse Brake and Signal Company Limited.*

Hereby enters this disclaimer to claim 10 of said patent.

[*Official Gazette August 13, 1968.*]